United States Patent
Liu et al.

(10) Patent No.: US 12,487,576 B2
(45) Date of Patent: Dec. 2, 2025

(54) POST-PROCESSING METHOD FOR SPECIAL SEVEN-FIVE AXIS LINKAGE MACHINE TOOL

(71) Applicant: JILIN UNIVERSITY, Changchun (CN)

(72) Inventors: Zhifeng Liu, Changchun (CN);
Yongsheng Zhao, Changchun (CN);
Caixia Zhang, Changchun (CN);
Congbin Yang, Changchun (CN);
Chuanhai Chen, Changchun (CN);
Jinyan Guo, Changchun (CN); Ying Li, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 384 days.

(21) Appl. No.: 18/325,275

(22) Filed: May 30, 2023

(65) Prior Publication Data

US 2023/0305514 A1    Sep. 28, 2023

Related U.S. Application Data

(63) Continuation of application No. PCT/CN2021/072537, filed on Jan. 18, 2021.

(51) Int. Cl.
*G05B 19/402*    (2006.01)
*B23Q 15/14*    (2006.01)

(52) U.S. Cl.
CPC .......... *G05B 19/402* (2013.01); *B23Q 15/14* (2013.01); *G05B 2219/42249* (2013.01)

(58) Field of Classification Search
None
See application file for complete search history.

(56) References Cited

U.S. PATENT DOCUMENTS 5,604,677 A * 2/1997 Brien ................. G05B 19/4068
                                                      700/262

* cited by examiner

*Primary Examiner* — Ryan A Jarrett
(74) *Attorney, Agent, or Firm* — HOWARD M COHN and Associates, LLC

(57) ABSTRACT

The present invention discloses a post-processing method for a special seven-five axis linkage machine tool, comprising: building a multi-body kinematic model according to the structure of the machine tool, and building the multi-body kinematic model according to the sequence of workpiece-turntable-machine tool-cross beam-ram-milling head-cutting tool; establishing position coordinate transformation matrices according to the built multi-body kinematic model to obtain the matrices of cutter location points and tool orientation vectors; solving transformation equations of every motion axis of the machine tool and cutter location point coordinates according to the matrices of cutter location points and tool orientation vectors; building a corresponding relationship between the cutter location point coordinates and every motion axis of the machine tool based on a geometric level, and solving specific values of C-axis rotation angle of milling head and C2-axis rotation angle of the turntable.

1 Claim, 2 Drawing Sheets

POST-PROCESSING METHOD FOR SPECIAL SEVEN-FIVE AXIS LINKAGE MACHINE TOOL

TECHNICAL FIELD

The present invention relates to a method for numeric control machining of a marine fixed pitch propeller, particularly relates to a post-processing method for a special seven-five axis linkage machine tool for machining of a marine propeller, which develops a post-processing method considering the desired effect of coordinate transformation which should be achieved from the view of geometric level based on the existing inverse kinematic solving method, and belongs to the technical field of CAD/CAPP/CAM.

BACKGROUND

A propeller is one of the most essential power parts of vessels, and its manufacturing accuracy has influences on many factors such as propelling efficiency and noise. The gantry machine tool with milling head is used to cut the fixed pith propeller, and then the surface of the propeller is polished manually to ensure the machining accuracy.

The size of the fixed pitch propeller is larger than an adjustable pitch propeller. Depending on different applications, its diameter is generally above 4 meters. The size of some large propellers can be up to 9-10 meters in diameter. For large propeller machining, a turntable is chosen instead of a linear guideway of gantry machine tool to achieve the goal of space saving.

The linkage form of the seven-five axis linkage machine tool for machining the propeller is different from the linkage form of an ordinary machine tool, and is composed of three rotary axes and two linear axes. The inverse kinematics solution of the machine tool is hard to obtain by common solving methods. There is a highly coupled problem of the rotation axes of the milling head and the rotation of the turntable in the inverse kinematics solving process.

SUMMARY

The present invention provides a post-processing method for a special seven-five axis linkage machine tool, so as to solve the problem that C-axis rotation angle of a milling head and C2-axis rotation angle of a turntable cannot be solved separately when the inverse kinematics of three rotary axes and two linear axes is solved, to generate the NC code for machining the propeller for use by the numerical control machine tool.

The present invention adopts the technical solution: a post-processing method for a special seven-five axis linkage machine tool comprises the following specific steps:

step 1: building a multi-body kinematic model according to the structure of the machine tool, and building the multi-body kinematic model according to the sequence of workpiece-turntable-machine tool-cross beam-ram-milling head-cutting tool;

step 2: establishing position coordinate transformation matrices according to the multi-body kinematic model built in step 1 to obtain the matrices of cutter location points and tool orientation vectors;

step 3: solving transformation equations of every motion axis of the machine tool and cutter location point coordinates according to the matrices of cutter location points and tool orientation vectors;

step 4: building a corresponding relationship between the cutter location point coordinates and every motion axis of the machine tool based on a geometric level, and solving specific values of C-axis rotation angle of milling head and turntable rotation (C2-axis) angle.

Step 4 comprises the following substeps:

S1. extracting cutter location point coordinates comprising cutter contact point coordinate (x,y,z) and the tool orientation vector (i,j,k) from a tool path of machining a propeller in CAM software, and measuring a distance between the coordinate point and workpiece coordinate origin to obtain the offset distances of $CL_X$, $CL_Y$ and $CL_Z$ in X, Y and Z direction in world coordinate system (WCS);

S2. measuring and recording the distances between tool setting position coordinate and workpiece coordinate origin after configuring each axis of the machine tool in CAM machining simulation software to obtain the offset distances of $ML_X$, $ML_Y$ and $ML_Z$ in X, Y and Z direction along the machine tool coordinate system;

S3. establishing a geometric map for $CL_X$, $CL_Y$, $CL_Z$, $ML_X$, $ML_Y$, $ML_Z$, cutter contact point coordinate (x,y,z), B-axis rotation angle β of milling head (B/C type of milling head as an example here), C-axis rotation angle $\theta_1$ of milling head, rotation angle $\theta_2$ of turntable and displacements of gantry machine tool linear axes (Y-axis and Z-axis) (Y and Z axis gantry machine tool as an example here), wherein the geometric map is comprised of two parts: the map in XY plane and YZ plane in machine tool coordinate system;

S4. establishing formulas of parameters based on the geometric map, to obtain the relationship between the rotation angle $\theta_2$ of the turntable and C-axis rotation angle $\theta_1$ of the milling head;

S5. substituting the relationship between the rotation angle $\theta_2$ of the turntable and the C-axis rotation angle $\theta_1$ of the milling head into the transformation equations of every motion axis of the machine tool and cutter location point coordinates in step 3 to obtain the function equation expression of motion of each axis of the machine tool.

Compared with the prior, the present invention has beneficial effects as follows:

The present invention is a post-processing method for a special seven-five axis linkage machine tool, which provides a post-processing method for the machine tool with three rotary axes and two linear axes. The existing conventional post-processing method for the machine tool cannot solve the C-axis rotation angle of the milling head and the C2-axis rotation angle of the turntable. The post-processing method provided by the present invention takes dimension parameters of the machine tool and the milling head into consideration from the view of the geometric level, simply and effectively solves the problem of calculating the C-axis rotation angle of the milling head and the C2-axis rotation angle of the turntable, and provides a method for post-processing for the machine tool with three rotary axes and two linear axes.

DETAILED DESCRIPTION

Figure 1:
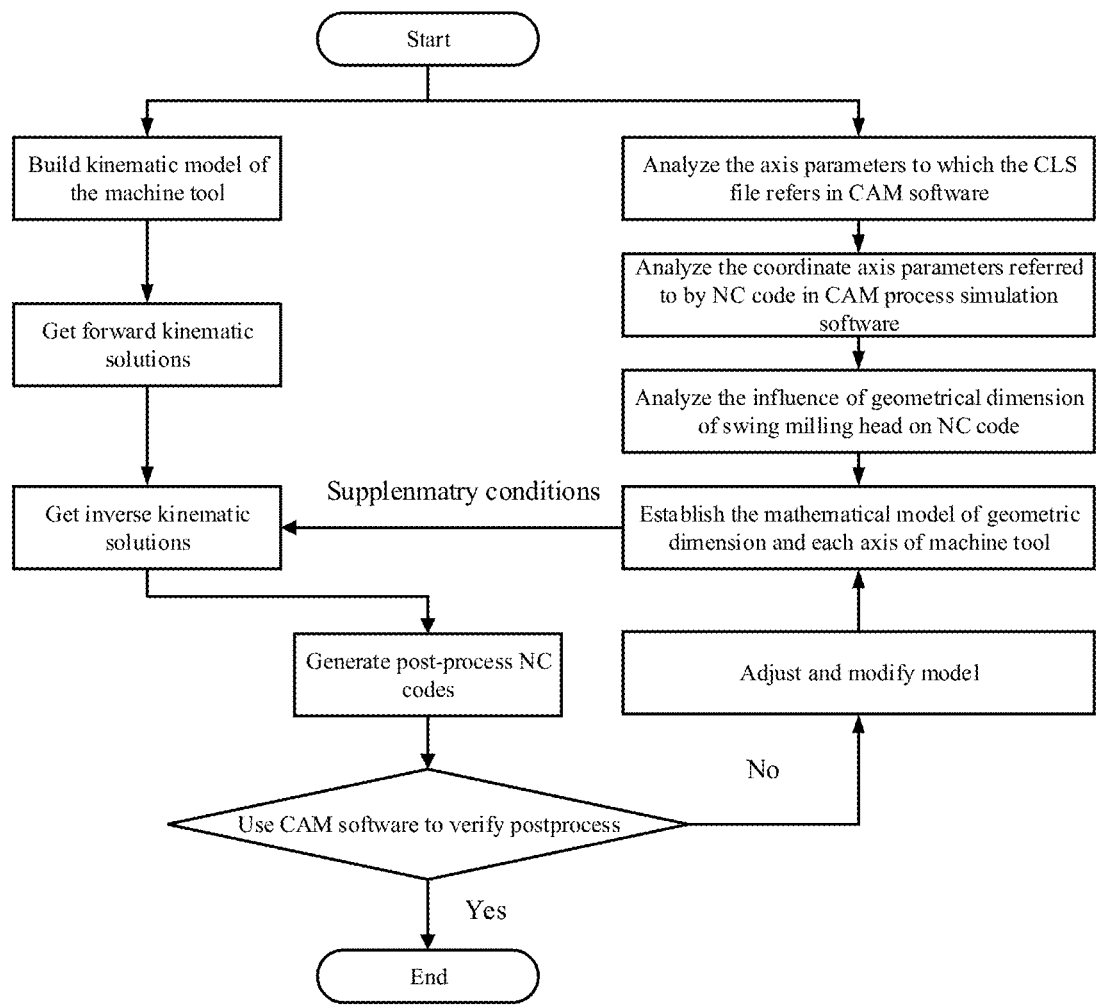
FIG. 1 is a flow chart of a post-processing method for a special seven-five axis linkage machine tool.
Figure 2:
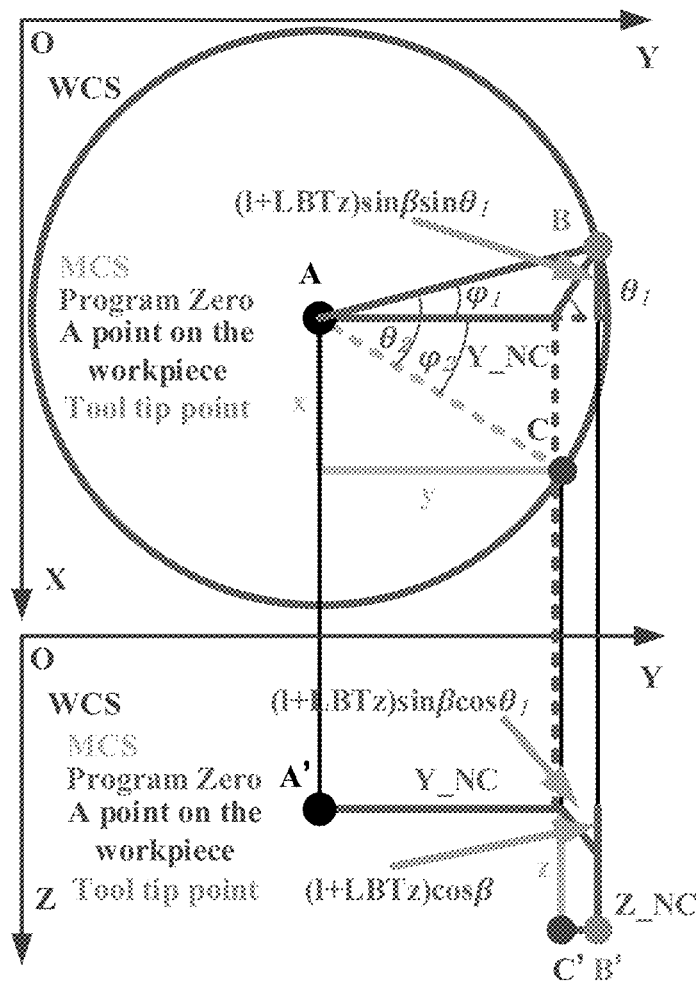
FIG. 2 is a geometric map of relationships of machine tool motion axes, cutter contact point coordinates and offset distances.

The present invention is described below in detail in combination with drawings and embodiments.

Aiming at the drawbacks of the existing post-processing method for a special seven-five axis linkage machine tool, the present invention proposes a post-processing method for a special seven-five axis linkage machine tool, to solve the problem that the C-axis rotation angle of the milling head and the C2-axis rotation angle of the turntable cannot be solved separately in solving inverse kinematic for three rotary axes and two linear axes, to generate the NC code for machining the propeller for use by the numerical control machine tool.

The present invention adopts the technical solution: a post-processing method for a special seven-five axis linkage machine tool comprises the following specific steps:

step 1: building a multi-body kinematic model according to the structure of the machine tool, and building the multi-body kinematic model according to the sequence of workpiece-turntable-machine tool-cross beam-ram-milling head-cutting tool;

step 2: establishing position coordinate transformation matrices according to the multi-body kinematic model built in step 1 to obtain the matrices of cutter location points and tool orientation vectors;

step 3: solving transformation equations of every motion axis of the machine tool and cutter location point coordinates according to the matrices of cutter location points and tool orientation vectors;

step 4: building a corresponding relationship between the cutter location point coordinates and every motion axis of the machine tool based on a geometric level, and solving specific values of C-axis rotation angle of milling head and turntable rotation (C2-axis) angle.

Step 4 comprises the following substeps:

S1. extracting cutter location point coordinates comprising cutter contact point coordinate (x,y,z) and the tool orientation vector (i,j,k) from a tool path of machining a propeller in CAM software, and measuring a distance between the coordinate point and workpiece coordinate origin to obtain the offset distances of $CL_X$, $CL_Y$ and $CL_Z$ in X, Y and Z direction in world coordinate system (WCS);

S2. measuring and recording the distances between tool setting position coordinate and workpiece coordinate origin after configuring each axis of the machine tool in CAM machining simulation software to obtain the offset distances of $ML_X$, $ML_Y$ and $ML_Z$ in X, Y and Z direction along the machine tool coordinate system;

S3. establishing a geometric map for $CL_X$, $CL_Y$, $CL_Z$, $ML_X$, $ML_Y$, $ML_Z$, cutter contact point coordinate (x,y,z), B-axis rotation angle β of milling head (B/C type of milling head as an example here), C-axis rotation angle $\theta_1$ of milling head, rotation angle $\theta_2$ of turntable and displacements of gantry machine tool linear axes (Y-axis and Z-axis) (Y and Z axis gantry machine tool as an example here), wherein the geometric map is comprised of two parts: the map in XY plane and YZ plane in machine tool coordinate system;

S4. establishing formulas of parameters based on the geometric map, to obtain the relationship between the rotation angle $\theta_2$ of the turntable and C-axis rotation angle $\theta_1$ of the milling head;

S5. substituting the relationship between the rotation angle $\theta_2$ of the turntable and the C-axis rotation angle $\theta_1$ of the milling head into the transformation equations of every motion axis of the machine tool and cutter location point coordinates in step 3 to obtain the function equation expression of motion of each axis of the machine tool.

Compared with the prior, the present invention has beneficial effects as follows:

The present invention is a post-processing method for a special seven-five axis linkage machine tool, which provides a post-processing method for the machine tool with three rotary axes and two linear axes. The existing conventional post-processing method for the machine tool cannot solve the C-axis rotation angle of the milling head and the C2-axis rotation angle of the turntable. The post-processing method provided by the present invention takes dimension parameters of the machine tool and the milling head in to consideration from the view of the geometric level, simply and effectively solves the problem of calculating the C-axis rotation angle of the milling head and the C2-axis rotation angle of the turntable, and provides a method for post-processing for the machine tool with three rotary axes and two linear axes.

What is claimed is:

1. A post-processing method for a special seven-five axis linkage machine tool, comprising the following specific steps:

step 1: building a multi-body kinematic model according to the structure of the machine tool, and building the multi-body kinematic model according to the sequence of workpiece-turntable-machine tool-cross beam-ram-milling head-cutting tool;

step 2: establishing position coordinate transformation matrices according to the multi-body kinematic model built in step 1 to obtain the matrices of cutter location points and tool orientation vectors;

step 3: solving transformation equations of every motion axis of the machine tool and cutter location point coordinates according to the matrices of cutter location points and tool orientation vectors;

step 4: building a corresponding relationship between the cutter location point coordinates and every motion axis of the machine tool based on a geometric level, and solving specific values of C-axis rotation angle of milling head and C2-axis rotation angle of the turntable;

wherein step 4 comprises the following substeps:

S1. extracting cutter location point coordinates comprising cutter contact point coordinate (x,y,z) and the tool orientation vector (i,j,k) from a tool path of machining a propeller in CAM software, and measuring a distance between the coordinate point and workpiece coordinate origin to obtain the offset distances of $CL_X$, $CL_Y$ and $CL_Z$ in X, Y and Z direction in world coordinate system (WCS);

S2. measuring and recording the distances between tool setting position coordinate and workpiece coordinate origin after configuring each axis of the machine tool in CAM machining simulation software to obtain the offset distances of $ML_X$, $ML_Y$ and $ML_Z$ in X, Y and Z direction along the machine tool coordinate system;

S3. establishing a geometric map for $CL_X$, $CL_Y$, $CL_Z$, $ML_X$, $ML_Y$, $ML_Z$, cutter contact point coordinate (x,y, z), B-axis rotation angle β of milling head, C-axis rotation angle $\theta_1$ of milling head, rotation angle $\theta_2$ of the turntable and displacements of gantry machine tool linear axes (Y-axis and Z-axis), wherein the geometric map is comprised of two parts: the map in XY plane and YZ plane in machine tool coordinate system;

S4. establishing formulas of parameters based on the geometric map, to obtain the relationship between the rotation angle $\theta_2$ of the turntable and C-axis rotation angle $\theta_1$ of the milling head;

S5. substituting the relationship between the rotation angle $\theta_2$ of the turntable and the C-axis rotation angle $\theta_1$ of the milling head into the transformation equations of every motion axis of the machine tool and cutter location point coordinates in step 3 to obtain the function equation expression of motion of each axis of the machine tool.

* * * * *